United States Patent
Athey et al.

(10) Patent No.: US 8,135,805 B2
(45) Date of Patent: Mar. 13, 2012

(54) CENTRALIZED FEED MANAGER

(75) Inventors: Kevin Athey, Fremont, CA (US); John Robison, Campbell, CA (US); Ashvinkumar P. Patel, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/874,054

(22) Filed: Sep. 1, 2010

(65) Prior Publication Data

US 2011/0153774 A1   Jun. 23, 2011

Related U.S. Application Data

(63) Continuation of application No. 11/593,365, filed on Nov. 6, 2006, now Pat. No. 7,792,926, which is a continuation of application No. 09/872,635, filed on May 31, 2001, now Pat. No. 7,177,931.

(51) Int. Cl.
*G06F 15/16* (2006.01)
*G06F 12/00* (2006.01)

(52) U.S. Cl. ........... 709/219; 709/225

(58) Field of Classification Search .......... 709/203, 709/217–219, 223–229, 250
See application file for complete search history.

(56) References Cited

U.S. PATENT DOCUMENTS

| | | | | |
|---|---|---|---|---|
| 6,047,327 A * | 4/2000 | Tso et al. | ........ | 709/232 |
| 6,332,157 B1 * | 12/2001 | Mighdoll et al. | ........ | 709/217 |
| 2001/0056460 A1 * | 12/2001 | Sahota et al. | ........ | 709/201 |

* cited by examiner

*Primary Examiner* — Zarni Maung
(74) *Attorney, Agent, or Firm* — Greenberg Traurig, LLP

(57) ABSTRACT

A method delivering content from a plurality of sources to a plurality of end servers through a central manager is provided. The method includes receiving the content from the plurality of sources at the central manager, formatting the content to a form usable by the plurality of end servers, creating a transaction generic to the plurality of end servers where the transaction includes a reference to a set of instructions for storing the formatted content, sending the transaction to an end server in the plurality of end servers, and calling the reference to execute the set of instructions where the set of instructions store the formatted content into the memory of the end server.

18 Claims, 5 Drawing Sheets

CENTRALIZED FEED MANAGER

CROSS-REFERENCES TO RELATED APPLICATIONS

The present application is a continuation of U.S. patent application Ser. No. 11/593,365 filed Nov. 6, 2006 now U.S. Pat. No. 7,792,926 and entitled "Centralized Feed Manager," which is a continuation of U.S. patent application Ser. No. 09/872,635 filed May 31, 2001, entitled "Centralized Feed Manager," and issued on Feb. 13, 2007 as U.S. Pat. No. 7,177,931, which is related to U.S. patent application Ser. No. 09/770,762, filed Jan. 25, 2001, entitled "High Performance Client-Server Communication System", and issued on Jan. 29, 2008 as U.S. Pat. No. 7,325,030, the contents of each of which are incorporated herein by reference for all purposes.

BACKGROUND OF THE INVENTION

The present invention relates to data distribution. More specifically, the present invention relates to the centralized distribution of Internet content.

With the growth of the global internetwork of networks generally referred to as the Internet, the amount of information accessible to people has increased tremendously. Information on the Internet can be generally referred to as "content" and can be any type of information, such as sports scores, weather, television listings, movie listings, etc. With the immense amount of content on the Internet, the task of finding content of relevance or interest becomes harder and harder for users. The organization of different web sites containing specific information facilitates a user's search. For example, sports web sites can be accessed for sports information, weather web sites accessed for weather information, and entertainment web sites for TV listings. However, a user may need varying kinds of information that specialized web sites do not provide. Thus, a user may have to search for the desired information and/or visit many web sites to retrieve the varying content. This process can be tedious and time consuming. Additionally, a user may not even find the desired content.

One solution is for the user to bookmark the different content specific sites making it easier for the user to visit the sites to access the applicable content. However, this process is still tedious and time-consuming in that a user has to download many different web pages.

Content specific web sites have attempted to address the problem by cross-referencing information related to other subjects. For example, a skiing web site might cross-reference or include information about the weather at certain ski resorts. Thus, a user would be able to read about the ski resort and also get weather information at the ski resort. The extra step of logging onto a weather web site to obtain the weather at the resort would then be avoided.

Additionally, web site providers allow users to customize web pages. For example, a user can be provided with their own customized web page. Typically, a content provider will supply a list of possible content that a user can display on the user's web page. The user can then select the desired content to be displayed on the user's personalized web page. Thus, a user can now access one web page to receive a multitude of varying information. For example, a user can organize a web page to display certain sports scores for a team, the weather in various cities, and stock quotes of specific corporations.

In order to provide a user with different content, web site providers must retrieve or receive data from many different sources. For example, the ski resort web site has to retrieve or receive weather information. Additionally, providers that supply customized web pages must receive content from an enormous number of sources. For example, in order to provide the one user's web page in the above example, the provider has to retrieve or receive sports, weather, and stock quote information, which is most often retrieved from different sources.

The information is usually retrieved by subscribing to a service that provides streaming content to the provider. Accordingly, specific streams of content are subscribed to by specific servers that serve up the content specific web pages. For example, a sports server would subscribe to sports service providing a stream of sports scores. Additionally, a weather server would subscribe to a weather service providing streaming weather content. In order to cross-reference content on different web pages, the servers associated with the cross-referencing web pages must communicate to transfer the desired content. For example, if the sports web page incorporates weather content, the sports server would maintain a connection to the weather server to retrieve weather content. Additionally, the server associated with the ski resort page would maintain a connection with the weather server to obtain weather content. Further, a customized user's page may require sports and weather information and thus, a server serving the user's web page would have to maintain connections to the sports and weather servers. With the increased usage and dependence on the Internet and as more and more users maintain personalized web pages and web sites include varying content to make the site comprehensive, servers must maintain connections with an enormous number of other servers.

Maintaining the high number of connections weighs down the bandwidth of a provider's network. Accordingly, additional equipment, such as servers and routers, must be installed to allow the servers to communicate efficiently. Typically, a server maintains computing scripts that define how to retrieve and parse content. In order to maintain the scripts, computing power and personhours are consumed by having to maintain the scripts on every server. Further, a typical implementation requires a large number of scripts, and the large number of scripts use up an immense amount of processing space in memory and also increase the probability of errors while running the scripts.

BRIEF SUMMARY OF THE INVENTION

In one embodiment, a method delivering content from a plurality of sources to a plurality of end servers through a central manager is provided. The method includes receiving the content from the plurality of sources at the central manager, formatting the content to a form usable by the plurality of end servers, creating a transaction generic to the plurality of end servers where the transaction includes a reference to a set of instructions for storing the formatted content, sending the transaction to an end server in the plurality of end servers, and calling the reference to execute the set of instructions where the set of instructions store the formatted content into the memory of the end server.

In another embodiment, a system for delivering content from a plurality of sources to a plurality of end servers is provided. The system includes a central manager coupled to the plurality of sources and configured to receive content from the plurality of sources, and a software process associated with the central manager, where the software process includes instructions to format the content and create a transaction generic to the plurality of end servers. Additionally, the transaction includes a reference to a set of executable instructions. Also, the plurality of end servers are coupled to the central manager and configured to receive the transaction and use the reference to execute the set of instructions to store the content into a memory device of an end server executing the set of instructions.

A further understanding of the nature and advantages of the invention herein may be realized by reference of the remaining portions in the specifications and the attached drawings.

DETAILED DESCRIPTION OF THE INVENTION

Figure 1:
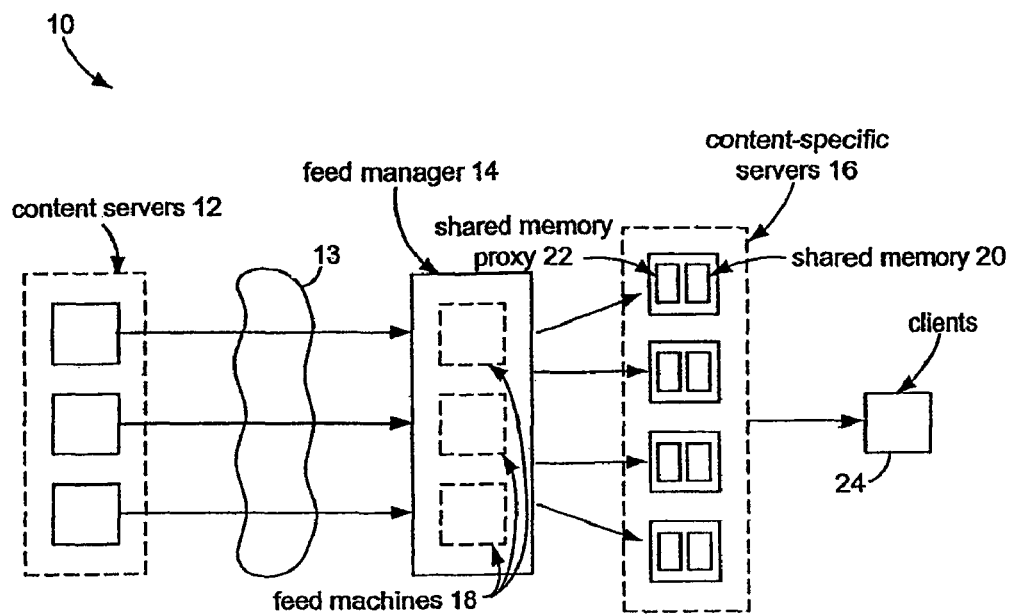
FIG. 1 illustrates a simplified block diagram of a centralized content distribution system according to one embodiment.

Referring to FIG. 1, system 10 includes a plurality of content servers 12 connected through a communication medium 13 to a centralized feed manager 14. Examples of possible communication media include the Internet, other digital media, wireless networks, and telephonic networks. The feed manager 14 is connected to a plurality of content-specific servers 16 ("CSservers") and is shown including a plurality of feed machines 18. Although FIG. 1 shows a one-to-one correspondence between content servers 12 and feed machines 18, that correspondence is not required, as some implementations may have one content server, other may have one feed machine, or some implementations will have more than one of each but an unequal number of each.

The content servers 12 can be any machines or software processes capable of providing a stream of content through the communication medium. Examples of content can include travel information, weather information, sports scores, etc. Content can be embodied as data in the form of text, graphics, video, audio, animation, program instructions, plug-ins, etc., or a combination of data forms. Although the term content is used hereinafter, any type of information can be distributed by the content servers 12. Content can be transferred from a content server 12 to a feed machine 18 using Internet protocols such as the Transfer Control Protocol/Internet Protocol (TCP/IP). Additionally, content can be provided in a constant stream where new data is sent continuously or the content can be provided at certain intervals. For example, content relating to constantly changing information, such as stock quotes can be sent continuously while content relating to less volatile information, such as weather, is sent at intervals, such as every fifteen minutes.

The centralized feed manager 14 can include one or more feed machines 18 capable of receiving and efficiently distributing the content. In one embodiment, the feed machine 18 is a web server, while in other embodiments, other types of servers are used. As shown, three feed machines 18 are provided; however, it should be understood that any number of feed machines 18 can be used. For example, the number of machines can be increased if the amount of content increases or can be decreased if the amount of content decreases. In one embodiment, feed machines 18 are identical/redundant to more efficiently process content and balance content load-processing. Thus, all feed machines 18 can receive the same content and preferably, content should be load-balanced between feed machines 18. It should be understood that the feed machines 18 can also perform different functions or be specialized for specific content. For example, a specific stream of content, such as sports, can be specific to one feed machine 18, a group of feed machines 18, or all of the feed machines 18.

The plurality of content-specific servers ("CSservers") 16 can be web servers capable of communicating with the feed manager 14. In other implementations, content-specific servers 16 can be servers of other types. Examples of content-specific servers 16 can be sports, travel, or weather servers. CSservers 16 receive content and ultimately push or serve the content to clients 24.

The CSservers 16 ca include a memory 20 and memory proxy 22. For example, as shown in FIG. 1, the CSservers 16 contain a shared memory 20 ("shm") and shared memory proxy 22 ("shmproxy"). Shared memory 20 is a memory device capable of storing content. Shared memory proxy 22 is a device capable of communicating with the feed manager 14 to pull the content and store the content in the shared memory 20. In a specific embodiment, the shared memory 20 and shared memory proxy 22 can be the shared memory and shared memory proxy described in U.S. Pat. No. 7,325,030 (application Ser. No. 09/770,762, filed Jan. 25, 2001 and entitled "High Performance Client-Server Communication System"), hereinafter "Wright", which is incorporated by reference herein for all purposes. Additionally, other methods of communicating with the feed manager 14 include protocols such as TCP/IP.

Clients 24 can be any computing device capable of connecting to the Internet or other digital medium. For example, a client can be a personal computer, work station, server, mainframe, personal digital assistant, handheld computer, wireless telephone, etc. In one embodiment, the clients can request content through an HTTP (HyperText Transfer Protocol) call. Once receiving the request, the CSserver 16 can serve or push the requested content to the client 24.

Figure 2:
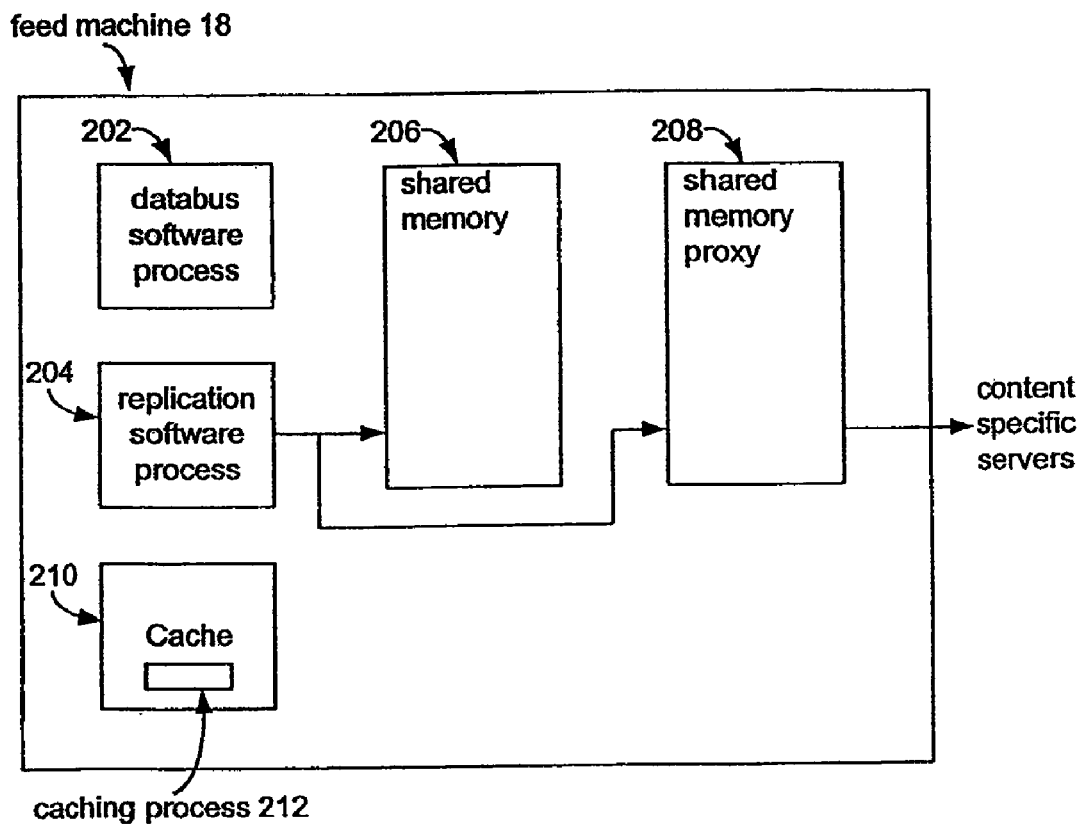
FIG. 2 illustrates a simplified block diagram of a feed machine according to one embodiment.

FIG. 2 shows the feed machine 18 of FIG. 1 in greater detail. The feed machine 18 is shown including a databus software process 202, a replication software process 204, an optional shared memory 206 ("shared memory"), a shared memory proxy 208 ("shared memory proxy"), and a cache 210. It should be understood that the databus software process 202 and replication software process 204 can be separate software modules, one software module, or be broken into multiple software modules among the processes. Typically, databus software process 202 and replication software process 204 are embodied by program code executed by a processor (not shown).

Shared memory 206 can be any memory device capable of storing data. Shared memory proxy 208 facilitates the transferring of data between the content specific servers' 16 shared memory proxy 22 and shared memory 20. Shared memory proxy 208 relays data from shared memory proxy 208 or shared memory 206 to the shared memory proxy 22 of the CSserver. In a specific embodiment, the shared memory 206 and the shared memory proxy 208 are as described in Wright.

In one embodiment, the databus software process 202 receives content from the content servers 12 and is coupled to the replication software process 204. Additionally, shared memory proxy 208 and the optional shared memory 206 relay content in the form of transactions from the replication software process 204 to the content specific servers 16. Further, the cache 210 is coupled to the replication software process 204.

The databus software process 202 receives content from the content servers 12 and converts it to the specific content required by the CSserver 16. A transaction is created by the databus software process 202 that is generic to the CSservers 16 and contains a subject that can be used for filtering and sorting. A transaction, described in more detail below, contains a reference, which can be the subject, to instructions for storing the content into memory. The instructions can be enclosed in the transaction, located on the executing CSserver 16, or located in a centralized depository. The instructions referenced in the transaction set the values related to the content into an executing CSserver's memory when executed. Thus, the replication software process 204 or content-specific server 16 can decode the transaction and use the reference to execute the instructions to store the content into shared memory 206 or shared memory 20. In one embodiment, the transaction is decoded by a C++ program to extract the reference to the instructions, which can be in the form of a C function call. The C function call is then executed and the content associated with the function call is loaded into the shared memory of the calling machine.

In one embodiment, a transaction, as discussed above, contains a function call or reference needed by a CSserver 16 to load the content into shared memory 20. The function can also serve as a subject that describes the type of content referenced by the function call or the transaction can contain a separate subject parameter. In one embodiment, the subjects can be separated by dots. Additionally, supersets can be specified by a right angle bracket (">"). For example, the following entries are a superset and two subjects:

feed.my.data.weather.v1.>
feed.my.data.weather.v1.link
feed.my.data.weather.v1.carb In one embodiment, for each subject section, a transaction is generated with a zero parameter representing the name of function and the subsequent parameters representing the content referred to by the name of the function and/or the instructions for loading the content into memory. Additionally, transactions can contain other information, such as an indication of when the content was received, such as a time stamp and unique identifier.

In one embodiment, a transaction is represented as:
subject=feed.my.data.sports.v1.0.NLSTL.NLMIL
sn=16019
time=99133031712
0=set_scores
1=0
2=NLSTL
3=NLMIL
4=MLB
5=St. Louis
6=Milwaukee
8=0
9=8:10 ET
10=http://sports.yahoo.com/mlb/previews/20010531/milstl.html
11=<tr align=right valign=top><td align=left>≦small><a href="http://sports.yahoo.com/mlb/">MLB</a></small></td><td align=left><small><a href="http://sports.yahoo.com/mlb/teams/mil/">Milwaukee<a> vs.<br><a href="http://sports.yahoo.com/mlb/teams/stl/">St. Louis</a></small></td><td><small>0<br>0</small></td><td> </td><td><small><a href=http://sports.yahoo.com/mlb/previews/20010531/milstl.html>8:10<br>ET</a></small></td></tr>

In the transaction, the "subject=" parameter represents the subject of the transaction. The "sn=" parameter represents a serial number. The serial number can be used to uniquely identify the transaction. The "time=" parameter represents a time stamp. The time stamp can be the number of seconds since EPOCH. The "0" parameter represents the function call. In this case the function call is to "set_scores". The 1-10 parameters represent the content associated with the transaction.

In another embodiment, a transaction series is represented as:
subject=feed.my.data.file.pSUB.g
file=start
time=99133770
sn=0
filename=/home/idaho/include/g/fin/updn
filesize=4054
chunksize=10000
modtime=991336864
filedatasize=
filedata=
subject=feed.my.data.file.pSUB.g
file=piece
time=99133770
sn=1
state=cacheignore
filename=/home/idaho/include/g/fin/updn
filesize=
chunksize=
modtime=991336864
filedatasize=4054
filedata=<table width="100%" border=0 cellpadding=4 cellspacing><tr bgcolor=DCDCDC>≦td colspan=2><table border=0 cellspacing=0 cellpadding=0 width="100%"><tr><td><font face=Arial size=-1><a href=http://biz.yahoo.com/c/20010509/u.html>Upgrades</a></font></td><td align=right><small>Wed, 12:00 pm ET</small></td></tr></table></td></tr><tr><td><small><a href=http://biz.yahoo.com/c/b/brw.html>BroadWing</a>≦/small></td><td etc.
subject=feed.my.data.file.pSUB.g
file=end
time=99133770
sn=2
state=cacheignore
filename=/home/idaho/include/g/fin/updn
filesize=
chunksize=
modtime=991336864
filedatasize=
filedata=

In this embodiment, the transaction series is sent in three pieces. However, it should be understood that the transaction can be sent in any number of pieces. The following parameters are contained in all three transactions. However, it should be understood that the transaction pieces can include any number of parameters and the parameters can be included in the transaction pieces in any combination. In other words, a first and second transactions can contain different parameters.

The "subject=" parameter represents the subject of "feed.my.data.file.pSUB.g". This subject is contained in all three transactions. The "file=" parameter describes the piece of the transaction. For example, the first transaction contains the parameter "start" indicating that the transaction is the start of the transaction series, the second transaction contains the parameter "piece" indicating the that transaction is a piece in the middle of the transaction series, and the third transaction contains the parameter "end" indicating the that transaction is the end of the transaction series. The "sn=" parameter represents a serial number for the transaction. As shown, the first, second, and third transactions have the serial numbers of 0, 1, and 2. The "filename=" represents a function call or can represent a file name where the data is stored. The "filesize=" parameter represents the file size. The "chunksize=" represents the size of each piece. The "modtime=" parameter represents a time stamp. The "filedatasize=" represents the file size. The "filedata=" parameter represents the content associated with the transaction. The "state" parameter represents a flag. In this case, the flag is "cacheignore", which can indicate that the content is not stored in cache.

In one embodiment, a transaction is formed by first parsing and converting received content into a form that can be read by all content specific servers 16. Once the content is parsed and converted, a transaction is formed containing a subject and the content. Content servers 12 stream content in all different forms. For example, a sports content server may stream sports scores in one format and a weather content server may stream weather content in a different format. If a CSserver 16 needed both the sports and weather content, the CSserver 16 would have to know how to transform two different kinds of content and transform the content. However, with a transaction, the content is transformed into a generic form readable by all CSservers 16. Thus, a specialized CSserver 16 only needs to know one format for a transaction and can decode the transaction to receive the already formatted content.

For example, sports content indicating a 7-5 score of a San Francisco Giants and New York Mets baseball game can come from a sports content server in any format. The databus software process 202 can parse the data and generate a transaction containing the data formatted as SFG/7:NYM/5. SFG/7 indicates the San Francisco Giants with a score of 7 and NYM/5 indicates the New York Mets with a score of 5. The formatted data can now be read not only by a sports CSserver but by any CSserver interested in the baseball score, such as a news CSserver. Additionally, weather content indicating that the weather in San Francisco is partly cloudy with a high of 70 and a low of 50 can come from a weather content server in any format. The databus software process 202 can then parse the data and generate a transaction containing the data formatted as SF/70/50. SF indicates that the city is San Francisco and the 70/50 indicates a high of 70 and low of 50. In this case, partly cloudy was determined to be unnecessary and not included in the transaction. The formatted data can now be read not only by a weather CSserver but by any CSserver interested in the weather in San Francisco, such as the sports and news CSservers 16.

With the use of transactions, the CSservers 16 do not need to convert the content received from the content servers 12. The formatting is done at the central feed manager 14 and sent through a transaction of a generic format readable by all CSservers 16. Thus, not only can all CSservers 16 read the transactions, all CSservers 16 can store the content without any formatting. Additionally, any changes in the content form from the content servers 12 are transparent to the CSservers 16 because the transaction format is constant. When the content format changes, the feed manager 14 can be adjusted to recognize the new content format but still format the changed content to the format the CSserver 16 recognizes. Thus, only the feed manager 14 is changed when the format from the content servers 12 changes, thereby eliminating numerous changes to all CSservers 16.

In one embodiment, replication software process 204 receives the transactions and handles distributing the transactions to the content-specific servers 16. The replication software process 204 includes instructions for sending the transactions to shared memory proxy 208. Thus, the replication software process 204 arranges a connection to relay the transaction to the content-specific servers 16 through shared memory proxy 208. In another embodiment, the replication software process 204 can also store the transaction in shared memory 206. In this case, the CSservers 16 can receive the transaction through the CSserver's shared memory proxy 22 through shared memory proxy 208 from shared memory 206.

A caching process 212 can also be included in one embodiment. The process caches the most recent transactions in storage. Additionally, the caching process can send a content-specific server 16 previously cached transactions. This can be referred to as replaying transactions because prior transactions are replayed to the CSservers 16. Using replay, CSservers 16 can rebuild their shared memory in situations where the CSservers' 16 shared memory is not up to date such as when the CSservers 16 reboot, crash, or catch up with prior transactions. The caching process 212 can read the transaction received from the replication process and store the transaction in a file in a desired form. When requested, the transactions can be forwarded to the CSservers 16 by sending files of transactions from the cache 210 to the CSservers 16. In one embodiment, the process can fork the contents of the cache 210 through a TCP/IP server, which responds to requests from the CSservers 16.

The cache 210 can be any device capable of storing information. For example, the cache 210 can be a server, data warehouse, or computer. It should be understood that although only one cache 210 is shown, multiple caches can be implemented. Additionally, the cache 210 can be separate from the feed machine 18. In one embodiment, cache 210 can be organized into three basic types assuming six different forms. A person of ordinary skill in the art would also know different ways of formatting the cache 210. The three types of cache 210 can be default, db, and flat.

The default type stores transactions sorted by subject in a linear file with one file per specific subject. The names of the file are stored can be stored in a Berkeley DB, which allows quick retrieval when being replayed during the catch up process, hereinafter described.

The db type stores the actual transactions by appending each transaction to the value field where the key is the specific subject. In a specific embodiment, the actual transactions are stored in a Berkeley DB.

The flat type determines a maximum area required to store each subject-based collection of transactions. If the maximum area is exceeded, the storage is then externalized into the aforementioned 'default' format. The primary benefit of the 'flat' type is quick replay by allowing linear replay, which is stepping through every subject to see if it should be replayed to the client/CSserver.

The six forms with their type in parenthesis can be described as default (default), db (db), flat (flat), conversation (db), file (default), and sports (default). The default form is implemented as the default type. The db form is implemented as the db type. The flat form is implemented as the flat type.

The conversation form is implemented on the db type. The conversation form examines the transactions and eliminates the unwanted content. Additionally, only the most recent transaction per subject is stored.

The file form is implemented on the default type. The file form records the name of a file of transactions in storage. In one example, the files are stored on a hard disk in a named location. An external file containing a list of transaction file names can be provided. Then, the external file can be read to find the transaction files that need to be replayed.

The sports form is implemented on the default type. It examines the transactions and discards certain transactions. The sports form is different from the conversation form in that all the transactions are stored in the sports form and only the most recent transactions are stored in the conversation form.

In one embodiment, the cache 210 is designed to receive transactions before the content-specific servers 16. If the transactions are not received first, transactions can be missed when CSservers 16 require transactions to be replayed. Additionally, replay order is not important outside a subject level; however, order is important on the subject level. In other words, the order of the transactions should be preserved within a subject, such as sports. Thus, if each transaction represents a score of a game, the transactions should be kept in the order from the beginning game scores to the end game scores. However, the order of the replay does not matter when replaying the subjects sports or weather. For example, when multiple subjects are requested, the time stamps of the transactions do not matter when comparing transactions in different subjects. However, the time stamps within a subject will be arranged in order.

Figure 3:
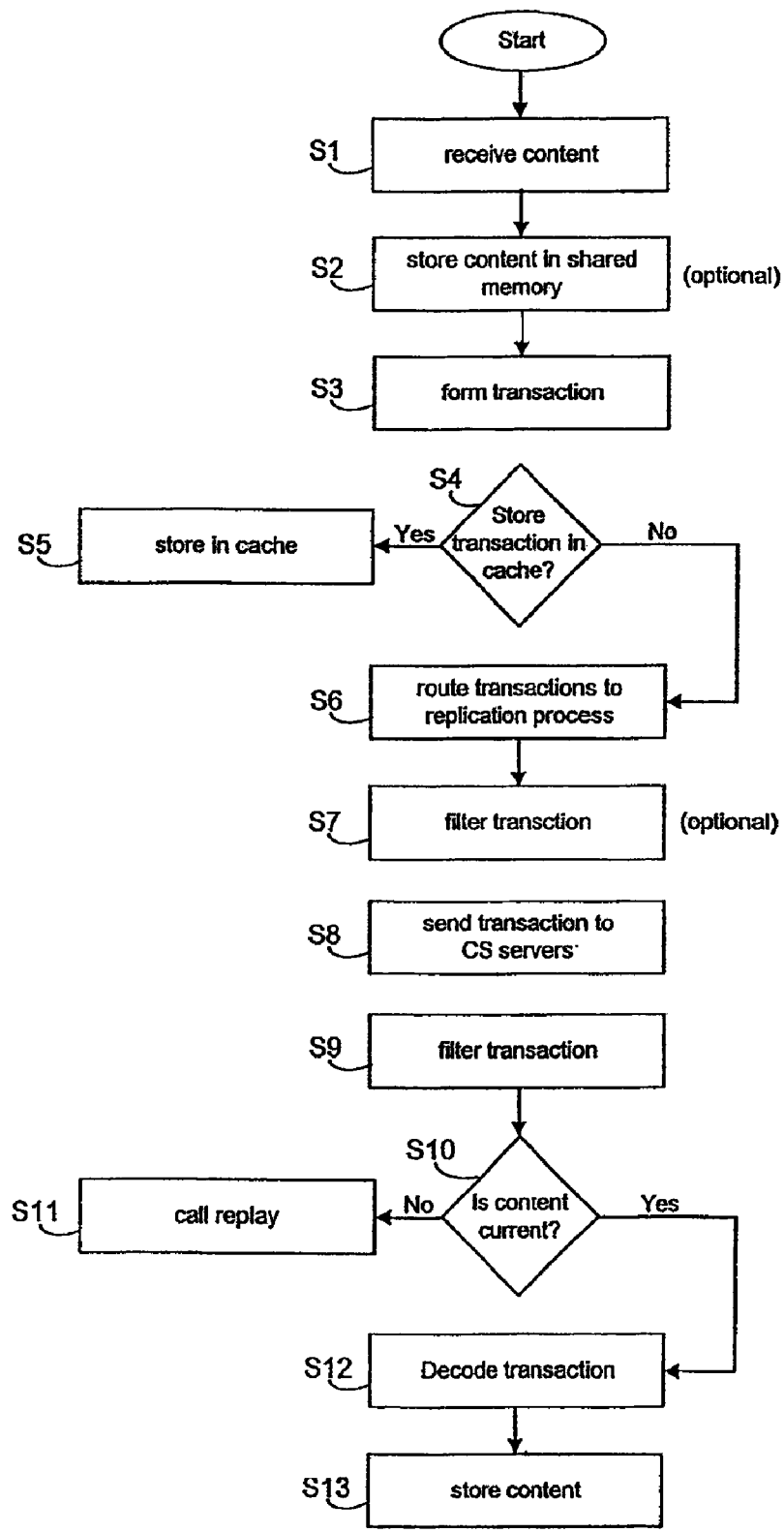
FIG. 3 illustrates a simplified method for distributing content through a feed manager according to one embodiment.

FIG. 3 illustrates a method of distributing content according to one embodiment shown with the steps S1, S2, etc. in an order most likely to be carried out. In step S1, content is received from various content servers 12 at the feed manager 14. Using the databus software process 202, the content can be optionally stored in the shared memory 206 (S2). A transaction is then formed containing the subject and function call usable to insert the content into shared memory 20 of the CSservers 16 (S3). In step S4, the transactions can be stored in cache 210 (S5) and/or routed to the replication process 204 (S6). If the transactions are stored in cache 210, the transactions are thereafter routed to the replication process 204 (S6).

The feed manager 14 can also optionally filter the transaction (S7). In one embodiment, the transaction can be sent to all or none of the CSservers 16 or only certain CSservers 16. If the transaction is to be sent to all of the CSservers 16, the transaction is not filtered. If the transaction is to be sent to none of the CSservers 16, the transaction can be filtered on a subject basis. In one embodiment, a list of subjects that are not to be sent to the CSservers 16 can be kept and when the current transaction subject matches a subject in the list, the transaction can be discarded. If the transaction is to be sent to some of the CSservers 16, the transaction can be filtered on a subject and CSserver basis. In one embodiment, a list of CSservers 16 and subjects needed by the CSservers 16 can be kept and the current transaction sent to only the CSservers 16 listed for the subject of the current transaction. In another embodiment, the CSserver 16 can subscribe to receive the transactions. Filtering the transactions at the feed manager 14 eliminates unnecessary transmittals of transactions to CSservers 16. Thus, network traffic is reduced because unnecessary transactions are not sent to every CSserver 16.

The transaction is then sent to the content-specific servers 16 (S8). Once receiving the transactions, the content-specific servers 16 can optionally filter the transaction (S9). In one embodiment, the CSserver 16 can read the subject and discard the transaction if the subject or content associated with the subject is not desired. Filtering the transaction at the CSserver 16 end allows the CSserver 16 to reduce data stored.

In step S10, the CSserver 16 determines if the content represented by the transaction is current. If not, the process of replay is called, hereinafter described. (S11). If so, the content-specific server decodes the transaction, hereinafter described, (S12) and stores the content (S13).

Figure 4:
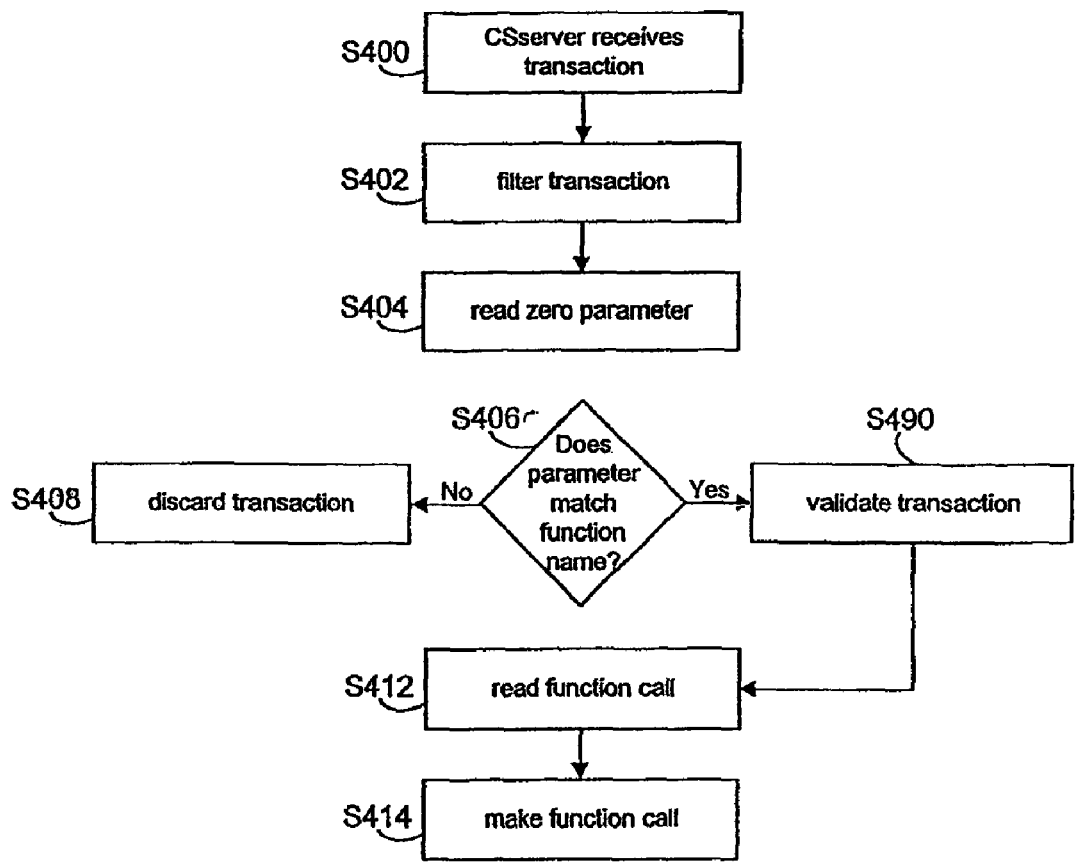
FIG. 4 illustrates a simplified method for decoding a transaction according to one embodiment.

FIG. 4 illustrates a method of decoding a transaction at a content-specific server according to one embodiment. In step S400, the content-specific server receives a transaction and examines the subject. After examining the subject, the CSserver 16 can filter the transaction and decide to keep or discard the transaction depending on whether the content associated with the subject is desired (S402).

If the CSserver 16 needs the content associated with the subject, the server reads in the zero parameter (S404) and determines if the parameter matches a function name (S406). If the zero parameter does not match a function name, the transaction is discarded (S408). If the function name is not matched, the function name is not validated. The function name is invalid because it is not possible to call the function if the function name is not found. In this case, the content represented by the transaction may not have been needed by the CSserver 16. If the parameter matches a function name, the transaction is validated (S410). In step S412, a parameter, such as the first parameter, corresponding to function call is read. The CSserver 16 then executes the function call in the first parameter to pull the content from the transaction. (S414).

Figure 5:
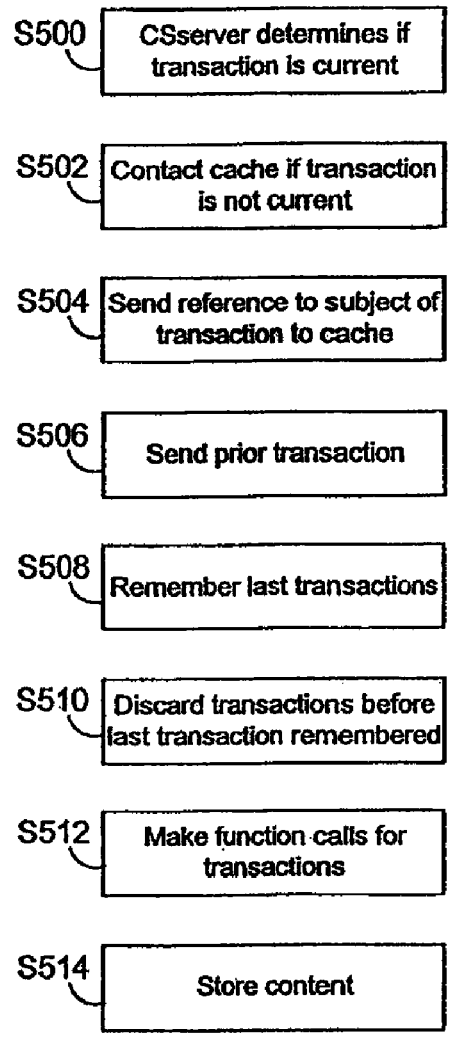
FIG. 5 illustrates a simplified method for catching up according to one embodiment.

FIG. 5 illustrates an embodiment of a method of replaying or catching up. A CSserver 16 may need to catch when the transaction received is not current, such as when the CSserver 16 was not shut down properly, the shared memory crashed, or when the CSserver 16 is initially turned on.

In step S500, the CS server 16 determines if the transaction is current. In one embodiment, the CSserver 16 determines if a transaction is current by reading a flag that indicates a transaction is not current. The flag can be specific for different subjects or can be indicative that all subjects are not current. Examples of when a flag can be set are when a CSserver 16 crashes, the shared memory of the CSserver 16 crashes, the CSserver 16 shuts down improperly, or when the CSserver 16 starts up. In another embodiment, the CSserver 16 reads an entry in a transaction that can be used to determine whether a transaction is current. For example, a time stamp can be read from the current transaction and compared to the time stamp of the last transaction. The CSserver 16 can then determine if the transaction is current based on the time stamps. For example, certain subjects may require time stamps at fifteen minute intervals. Thus, if the last time stamp is at 10:30 and the current time stamp is at 11:00, the CSserver 16 would know that the 10:45 time stamp is missing and the catching up process needs to be called to read in the 10:45 transaction.

In step S502, the CSserver 16 contacts the caching server if the transaction is not current. In one embodiment, a reference to the subject of the transaction is then sent (S504). In step S506, the caching server sends all the prior transactions related to the subject in memory or a certain specified number to the CSserver 16. In order to avoid repeating transactions, the CSserver 16 can then remember the last transaction received (S508). If so, the CSserver 16 parses through the file discarding any transactions received before the last transaction (S510). In step S512, the associated function calls are made for each successive transaction and the associated content is loaded into shared memory 20 (S514). The process ends when the CSserver 16 is caught up or there are no more transactions in the file to process.

In another embodiment where the CSserver 16 does not remember the last transaction, all the transactions can be read in and the associated function calls made. In this case, portions of the CSserver's shared memory 20 would be replaced. However, the modified shared memory 20 still accurately represents how the shared memory 20 should be structured because the transactions are sent in the order that they were previously sent.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalence.

What is claimed is:

1. A method comprising:
    receiving, by an end server from a central content feed manager, a plurality of transactions for content from a plurality of different content sources, the plurality of transactions received by the end server having a common format regardless of content format used by a content source of the plurality of different content sources, a received transaction of the plurality of transactions including information identifying a set of instructions to retrieve the content for the received transactions and store the retrieved content into memory;
    retrieving, by the end server, the content for the received transactions by executing the set of instructions identified using the information contained in the received transaction and storing the retrieved content into memory;
    sending, by the end server, the stored content to a plurality of clients.

2. The method of claim 1, the information contained in the received transaction comprising a reference to the set of instructions, the retrieving the content for the received transactions comprising:
    calling, by the end server, the reference to execute the set of instructions to retrieve the content.

3. The method of claim 1, further comprising determining if the received transaction is current.

4. The method of claim 3, further comprising:
    determining, by the end server, whether the received transaction is current using a time stamp from a previous-received transaction and a time stamp from the received transaction;
    requesting, by the end server, at least one transaction that has a time stamp prior to the received transaction when the received transaction is determined to not be current; and
    retrieving, by the end server, content for a received prior transaction using a set of instructions identified using information contained in the received prior transaction and storing the received prior transaction's retrieved content into memory;
    sending, by the end server, the prior transaction's stored content to a plurality of clients.

5. The method of claim 4, further comprising:
    determining, by the end server, that a prior transaction of the at least one transaction requested is unneeded, and discarding the unneeded prior transaction.

6. The method of claim 1, further comprising filtering the content at the end server.

7. A system comprising:
    an end server computer, the end server computer having a processor and memory, the memory storing instructions that when executed by the processor perform a process comprising:
        receiving, from a central content feed manager, a plurality of transactions for content from a plurality of different content sources, the plurality of transactions received by the end server having a common format regardless of content format used by a content source of the plurality of different content sources, a received transaction of the plurality of transactions including information identifying a set of instructions to retrieve the content for the received transactions and store the retrieved content into memory;
        retrieving the content for the received transactions using the set of instructions identified using the information contained in the received transaction and storing the retrieved content into memory;
        sending the stored content to a plurality of clients.

8. The system of claim 7, the information contained in the received transaction comprising a reference to the set of instructions, the retrieving the content for the received transaction comprising:
    calling the reference to execute the set of instructions to retrieve the content.

9. The system of claim 8, the process further comprising determining if the received transaction is current.

10. The system of claim 9, the process further comprising:
    determining whether the received transaction is current using a time stamp from a previous-received transaction and a time stamp from the received transaction;
    requesting at least one transaction that has a time stamp prior to the received transaction when the received transaction is determined to not be current; and
    retrieving content for a received prior transaction using a set of instructions identified using information contained in the received prior transaction and storing the received prior transaction's retrieved content into memory;
    sending the prior transaction's stored content to a plurality of clients.

11. The system of claim 10, the process further comprising:
    determining that a prior transaction of the at least one transaction requested is unneeded, and discarding the unneeded prior transaction.

12. The system of claim 8, the process further comprising filtering the content.

13. A non-transitory computer readable storage media for tangibly storing thereon computer readable instructions, the computer readable instructions, when executed by a processor:
    receive, at the computing device, from a central content feed manager, a plurality of transactions for content from a plurality of different content sources, the plurality of transactions received by the end server having a common format regardless of content format used by a content source of the plurality of different content sources, a received transaction of the plurality of transactions including information identifying a set of instructions to retrieve the content for the received transactions and store the retrieved content into memory;
    retrieve, by the computing device, the content for the received transactions using the set of instructions identified using the information contained in the received transaction and storing the retrieved content into memory;
    send, by the computing device, the stored content to a plurality of clients.

14. The non-transitory computer readable medium of claim 13, the information contained in the received transaction comprising a reference to the set of instructions and the computer readable instructions that cause the computing device to retrieve the content for the received transaction further comprising computer readable instructions that, when executed by the processor, cause the computing device to:
 call the reference to execute the set of instructions to retrieve the content.

15. The non-transitory computer readable medium of claim 14, the computer readable instructions further comprising instructions that, when executed by the processor, cause the computing device to determine if the received transaction is current.

16. The non-transitory computer readable medium of claim 15, the computer readable instructions further comprising instructions that, when executed by the processor, cause the computing device to:
 determine whether the received transaction is current using a time stamp from a previous-received transaction and a time stamp from the received transaction;
 request at least one transaction that has a time stamp prior to the received transaction when the received transaction is determined to not be current; and
 retrieve content for a received prior transaction using a set of instructions identified using information contained in the received prior transaction and storing the received prior transaction's retrieved content into memory;
 send the prior transaction's stored content to a plurality of clients.

17. The non-transitory computer readable medium of claim 16, the computer readable instructions further comprising instructions that, when executed by the processor, cause the computing device to:
 determine that a prior transaction of the at least one transaction requested is unneeded, and to discard the unneeded prior transaction.

18. The non-transitory computer readable medium of claim 14, the computer readable instructions further comprising instructions that, when executed by the processor, cause the computing device to filter the content at the end server.

* * * * *